United States Patent [19]

Mueller

[11] Patent Number: 5,427,568

[45] Date of Patent: Jun. 27, 1995

[54] METHOD AND APPARATUS FOR DESPINING CACTUS

[75] Inventor: Dennis M. Mueller, Wellington, Colo.

[73] Assignee: The United States of America as represented by the Secretary of Agriculture, Washington, D.C.

[21] Appl. No.: 318,945

[22] Filed: Oct. 6, 1994

Related U.S. Application Data

[62] Division of Ser. No. 199,436, Feb. 22, 1994.

[51] Int. Cl.⁶ .................................................. A22C 17/00
[52] U.S. Cl. .................................... 452/198; 452/135
[58] Field of Search .................. 452/198, 99, 138, 135

[56] References Cited

U.S. PATENT DOCUMENTS

| | | | |
|---|---|---|---|
| 3,396,768 | 8/1968 | Kurihara | 452/138 |
| 3,829,931 | 8/1974 | Suerbaum | 452/138 |
| 4,485,526 | 12/1984 | Opanasenko | 452/99 |
| 4,637,094 | 1/1987 | Matsubayashi | 452/138 |
| 4,839,942 | 6/1989 | Damp | 459/99 |
| 4,875,255 | 10/1989 | Kent | 452/99 |
| 4,899,890 | 2/1990 | Ewing et al. | 452/138 |

Primary Examiner—Willis Little
Attorney, Agent, or Firm—M. Howard Silverstein; John D. Fado

[57] ABSTRACT

Spiny pads are centrifugally propelled in a spiralling-outward pathway by means of a plurality of fingers that swing around a cylindrical chamber from a concentric shaft. The interior surface of the chamber is partially lined with spine shearers such as a rasp, so that the pads scrape against the rasp and thereby are despined. Spine pieces leave the chamber through small perforations in the chamber wall.

2 Claims, 4 Drawing Sheets 5,427,568

METHOD AND APPARATUS FOR DESPINING CACTUS

This application is a division of Ser. No. 8/199,436, filed Feb. 22, 1994.

FIELD OF THE INVENTION

The present invention relates to removing spines from cactus.

PRIOR ART

Plains pricklypear cactus (*Opuntia polyacantha* L.) is abundant on the Central Great Plains, producing dry matter yields from 1500 to 2000 kg/ha. Although highly nutritious and palatable to livestock, long sharp spines essentially make it, and vegetation immediately surrounding it, unavailable as livestock feed.

It has been shown that pricklypear pads are quite palatable once spines have been removed. In the prior art, singeing in place has been employed to make the cactus available in the field as feed. However, spines usually are not sufficiently removed, and adjacent forage is destroyed in the process.

SUMMARY

A new method and apparatus now has been developed for removing spines from spiny cactus pads. Broadly, the method comprises:

a. centrifugally propelling the pads in a spiralling-outward pathway, wherein said pathway's outermost perimeter is partially lined with spine shearers so that any pads travelling along said outermost perimeter come in contact with the spine shearers thereby forming spine pieces and at least partially despined pads; and b. separating the spine pieces from the at least partially despined pads.

Preferably, despining is accomplished serially in a plurality of spiralling-outward pathways so that the pads become progressively more despined in each stage and are substantially completely despined by the last stage.

As used herein, "substantially completely despined" means the pads are despined to the degree that they readily are accepted by livestock (e.g., cattle) as a feed material.

The apparatus comprises:
a. a cylindrical wall defining a chamber;
b. opening means in the chamber to permit spiny cactus pads to be fed thereto;
c. spine shearing means partially lining the wall's interior surface;
d. generally concentric shaft means within the chamber;
e. a plurality of fingers connected at one end to the shaft means and extending towards the wall, terminating in close proximity to but not touching the wall;
f. means to swing the fingers around the chamber so that they propel spiny cactus along the shearing means in order to shear spines therefrom so as to form spine pieces and despined pads;
g. a plurality of perforations in the wall, the perforations being large enough to permit the spine pieces, but not despined pads, to exit the chamber.

An object of the present invention is to allow a rancher to pay for the cost of pricklypear control by making cactus available as feed for livestock.

A further object is to provide a feedstock equal to or superior to that of high quality alfalfa hay.

Another object is to provide equipment to remove spines from harvested pricklypear cactus thereby making it palatable to livestock.

Other objects and advantages will be obvious from the following more detailed description of the invention taken in conjunction with the drawings in which.

Figure 1:
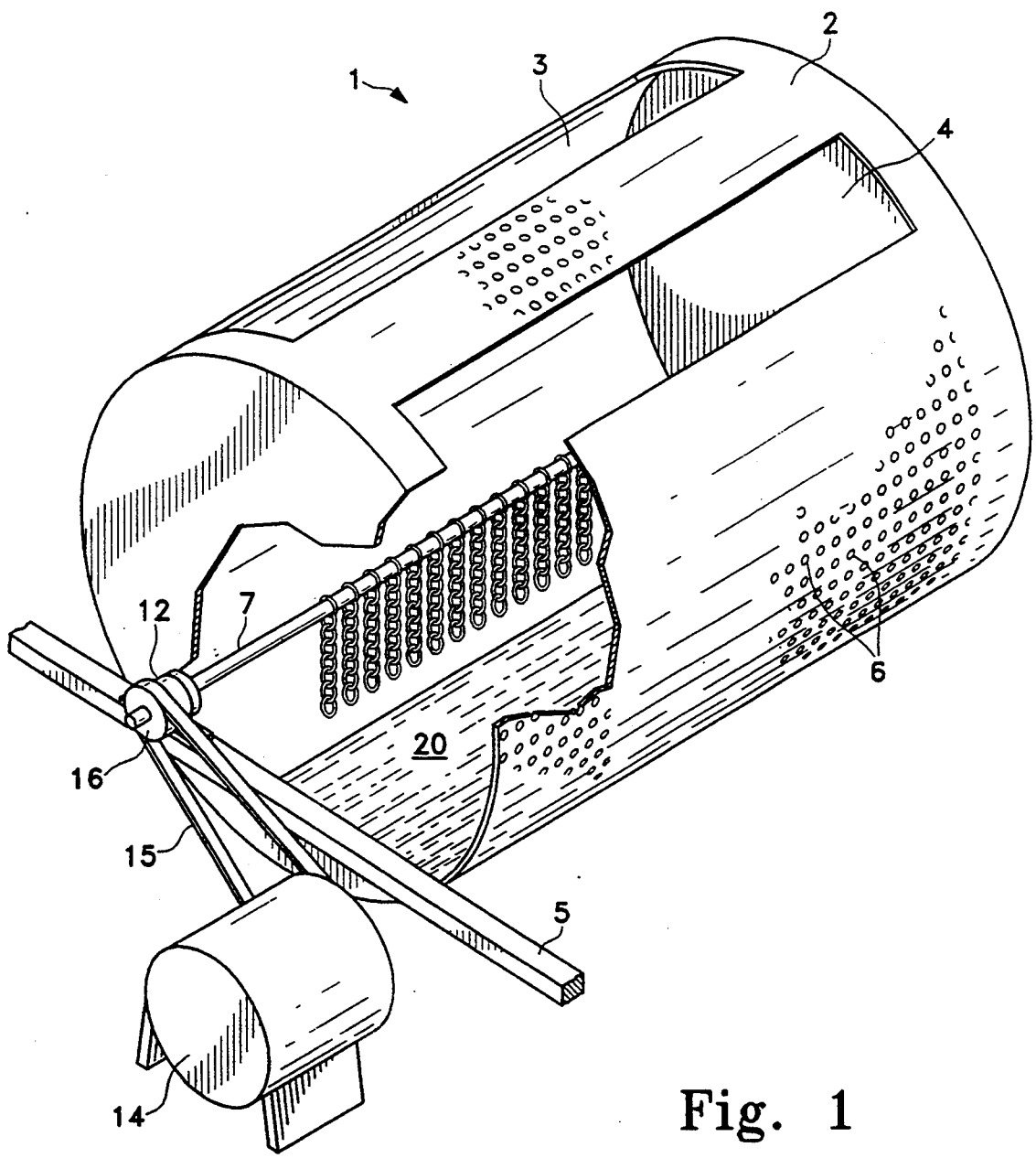
FIG. 1 is a cut-a-way perspective view of a single chamber of the present invention.
Figure 2A:
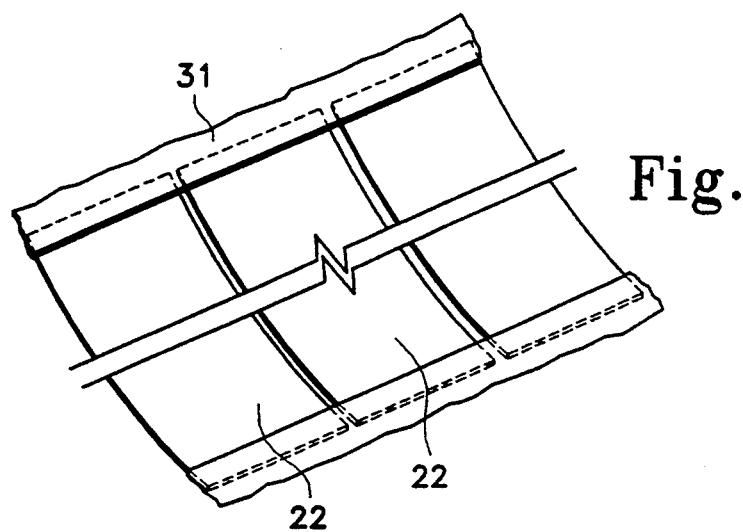
Figure 2B:
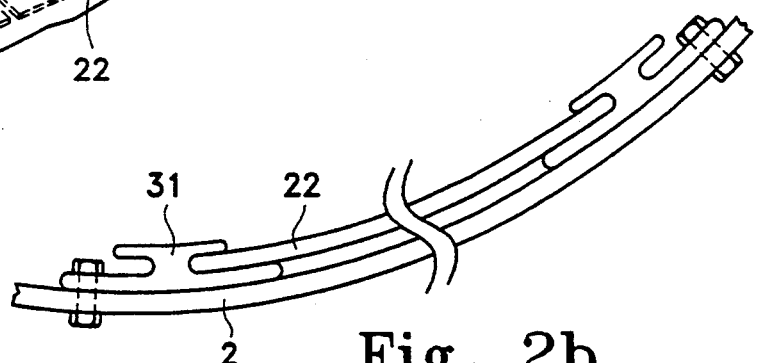
Figure 2C:
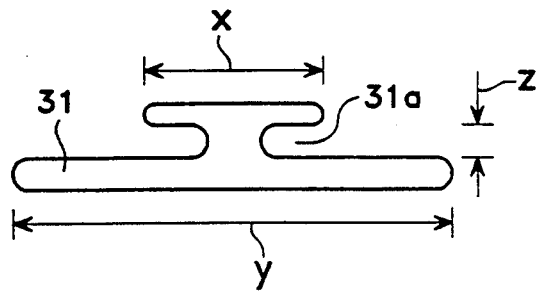
Figure 3:
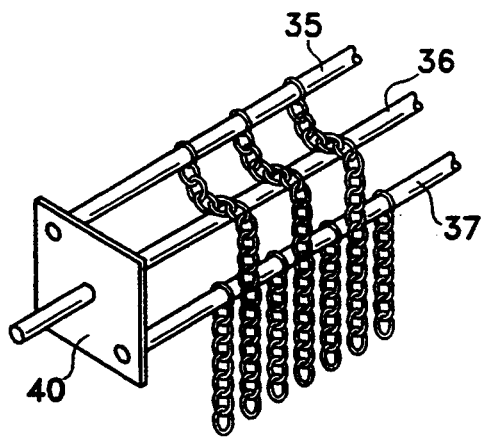

FIGS. 2a–c illustrate a preferred way to secure the spine shearers to the interior of the chamber;

FIG. 3 shows a preferred arrangement for the chains of FIG. 1.

Figure 4:
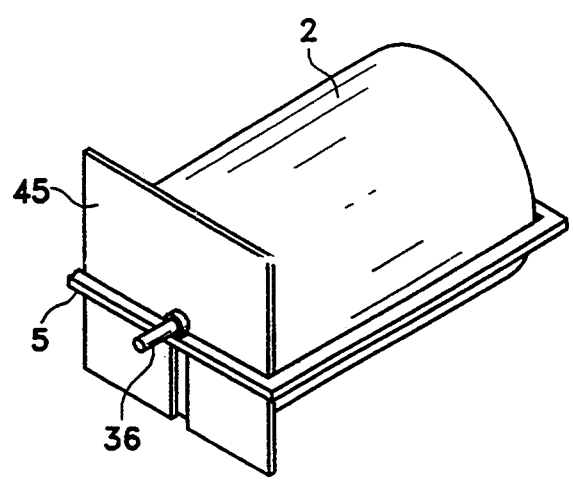

FIG. 4 illustrates preferred means for closing off the ends of a chamber.

Figure 5:
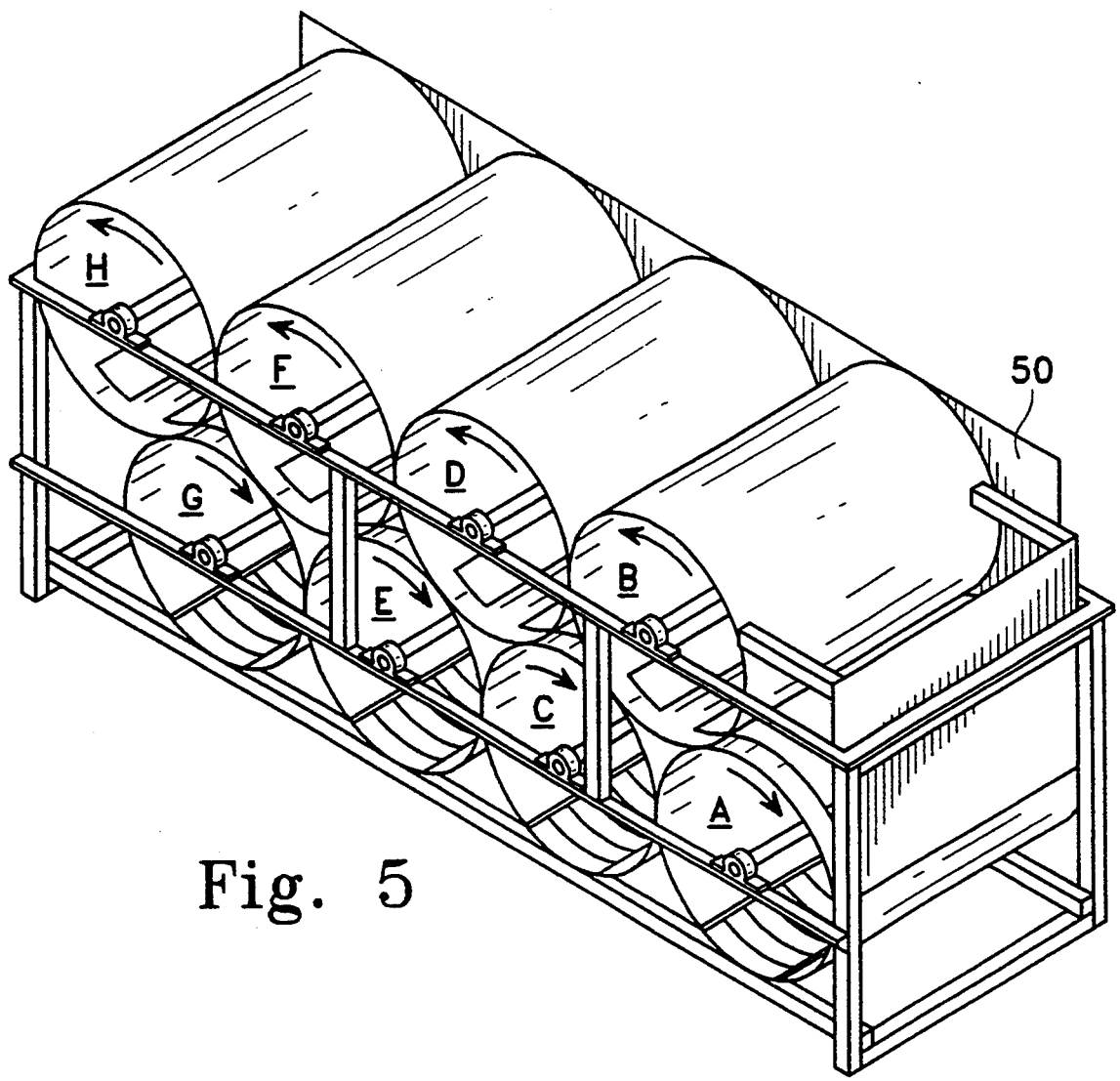
Figure 5A:
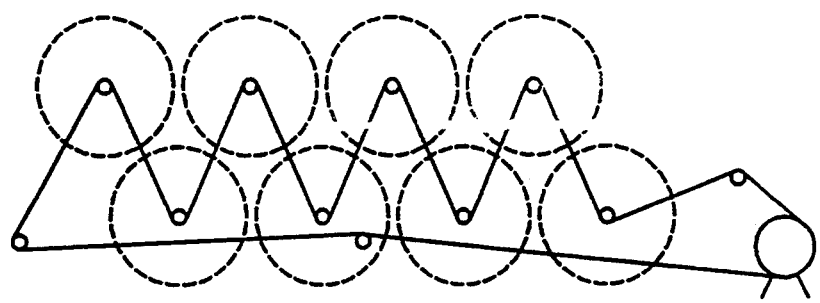

FIGS. 5 and 5a illustrate a multi-stage unit of the system of the present invention.

DETAILED DESCRIPTION

Figure 1A:
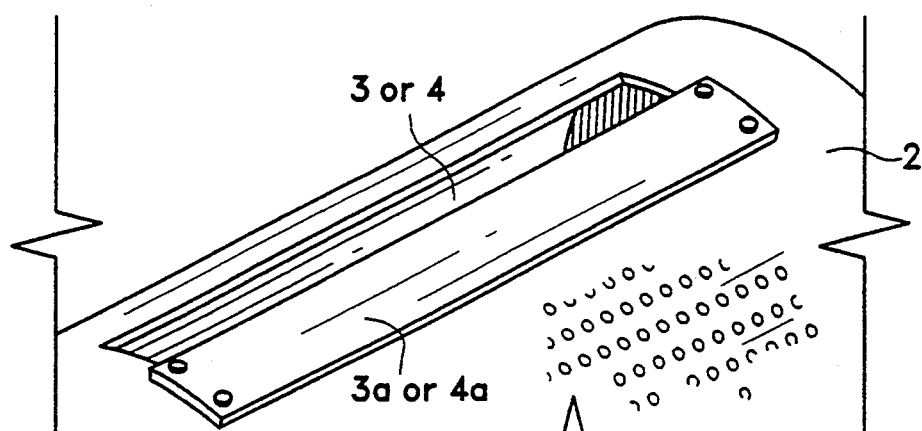
FIG. 1a is a modification to the openings or slots in the chamber of FIG. 1.

Referring to FIG. 1, a horizontally disposed despining chamber 1 closed at both ends is defined by a cylindrical wall 2. Reference numerals 3 and 4 designate entry and egress openings or slots for the pads. As shown in FIG. 1a, cover plates 3a or 4a may be provided to adjust the size of, or close, the openings or slots 3 or 4. The chamber may be held stationary by being welded or otherwise secured at one or more points along a framework having a segment 5.

There are perforations 6 throughout the cylindrical wall 2 in order to permit spine pieces to exit the chamber and thereby cause a separation between spine pieces and despined cactus pads. A perforation diameter of about 0.3 to 1.0 cm., preferably about 0.6 cm., ordinarily will be suitable.

A rotatable concentric shaft 7 extends through the chamber. The fingers for impelling or propelling the pads are provided by a plurality of chains or flexible straps 9 connected at one end to shaft 7 while being free at the other end. (Hereinafter the invention will be described in the context of the preferred form of the fingers, namely chains.)

The chains are sufficiently secured at one end to the shaft in order to whip around the chamber as the shaft is rotated. This may be done by crimping an end link around the shaft or supergluing to the shaft so that the end link will rotate with the shaft.

Figure 1B:
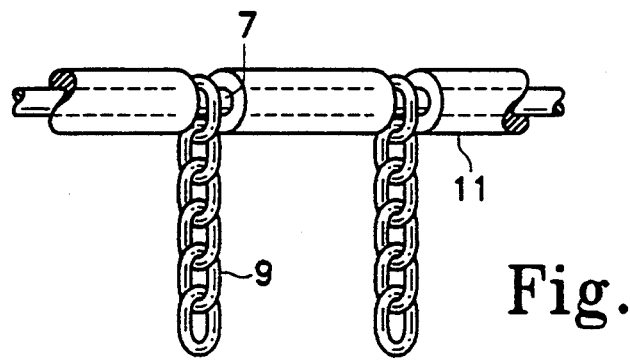
FIG. 1b, illustrates means for spacing the chains in FIG. 1.

As shown in FIG. 1b, a series of spacers 11 on shaft 7 maintain spacing between chains.

Shaft 7 is journalled for rotation in a pillow block bearing 12 secured to segment 5 of the framework, and rotated by means of motor 14 in combination with a chain or belt drive 15 and sprocket or pulley 16.

The spine shearing means which lines part of the interior of wall 2 preferably is provided by a rasp-like surface 20 whose multiple cutting projections are directed toward the oncoming pads. As an alternative to the rasps, a series of longitudinal blades may be secured to the inner wall of the chamber and angled toward the oncoming pads. The spine shearing means ordinarily covers about 15% to 100% of the interior surface of the cylinder. When employing small shearing areas, it may be necessary to increase despining time or employ a series of chambers.

Figure 1C:
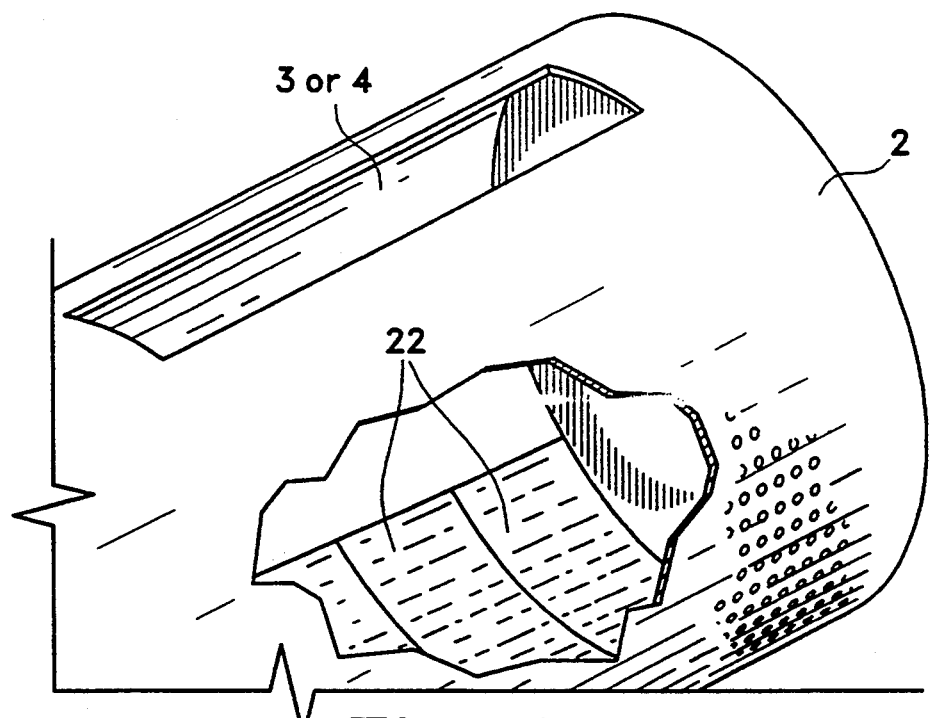
FIG. 1c illustrates a preferred shearing means for the chamber of FIG. 1.

As shown in FIG. 1c, the shearing means preferably comprises a plurality of parallel flexible rasps 22 of the type presently employed for shaping autobody plastic, known as "sure form" rasps.

The length of the chains is such that the ends thereof come very close to but do not touch the cutting projections of the spine shearing means, e.g., within 1 cm of the shearing means. The rotating chains centrifugally impel or propel the spiny pads along and against the shearing means to be scraped thereby so that the spines become detached by the shearing action of pad against the cutting edge of the shearing means.

During operation, as the chains are made to swing through the cylindrical chamber, pads are loaded into the chamber through the forward-most slot in the direction of pad movement. Adjustment of the size of the slots and the speed of the chains, i.e., shaft rpm, controls the flow rate of cactus pads through the chamber. Chain speed also controls the centrifugal force needed to remove spines from cactus without excessive pad damage. A linear speed of pads at the surface of the shearing means ranging from about 10 to 56 ft/sec is suitable, depending on pad moisture and relative humidity surrounding the pad.

Referring to FIGS. 2a-c, each individual rasp 22 in the preferred embodiment of the spine shearing means may be held in place by inserting opposite ends in a groove 31a in a supporting strip 31, and bolting the strips to the chamber wall. Linoleum edging is suitable as a material of construction for the strips. Other materials of appropriate strength and flexibility also may be employed. That part of the chamber wall which is covered by the rasps may be perforated in the same manner as the rest of the chamber wall so that spine pieces falling through rasps may exit the cylinder.

With reference to FIG. 2c, the following are exemplary dimensions for a strip 31 composed of linoleum edging, for a rasp having a thickness of 0.3 cm:

x=0.64 cm, y=2.54 cm, z=0.32 cm

In a preferred embodiment shown in FIG. 3, the means for chain rotation comprises a plurality of rods 35, 36 and 37 extending through the chamber. The rods are connected to one another through a plurality of plates 40 (end plates and one or more intermediate plates). The end plates are recessed about ¼" inside the drums. All the rods may be fixed, e.g., welded, to the plates. Central rod 36 is directly driven, which in turn causes chain-bearing rods 35 and 37 to revolve therearound.

Rather than welding chain-bearing rods 35 and 37 to the end plates, both ends of each rod simply may extend through a hole in its respective end plate. One extension may be threaded, while its opposite end may include a washer welded thereto as a stop against the inside surface of its respective end plate. A bolt on the threaded end then may be tightened to "squeeze" the rod in tight engagement between both end plates.

In the arrangement of FIG. 3, the orbital movement of shafts 35 and 37 around concentric shaft 36 causes the chains to swing through the chamber. It is not necessary for the end link of each chain to firmly engage its respective shaft as is the case in the embodiment of FIG. 1.

Preferable means for closing off an end of a despining chamber are illustrated in FIG. 4. In this embodiment, segment 5 of the framework is spaced about ¼" from the end of the chamber, and a slotted sheet metal plate 45 simply is dropped over the extension of central shaft 36 between the chamber and segment 5.

Referring to FIG. 5, in a preferred arrangement, as many as eight stationary chambers may be combined together in a multistage operation, four chambers in an upper tier, four in the lower tier. The chains or straps in each chamber are driven simultaneously in the direction of the arrows by the driving scheme shown in FIG. 5a. In the bottom tier of chambers, the entry-egress slots are positioned in the upper hemisphere of each stationary chamber, and the rasps are located in the lower hemisphere. In the upper tier of chambers, these components are reversed. The pads initially are fed to the lower right corner chamber A and progress to B then to C and so forth, and finally exit from upper left corner H. The entry and egress slots in adjacent cylinders are aligned with one another so that pads exiting one cylinder immediately enter an adjacent cylinder in the series for progressive despining that is completed in H.

The end closures for each of the eight chambers in FIG. 5 are provided by a single sheet of metal on each side of the multi-stage arrangement (one side of the multistage unit is illustrated without a closure for purposes of showing interior components). Reference numeral 50 designates such a metal sheet.

Typical dimensions of a preferred chamber for use in an eight-chamber multi-stage arrangement as illustrated in FIG. 5 are as follows:

chamber length: 76.2 cm
thickness of chamber wall: 0.3 cm
internal diameter of chamber: 48.7 cm
perforation diameter: 0.6 cm
distance between perforations: 0.3 cm
each rasp: 3.8×25.4×0.3 cm
number of rasps: 17
pad entry and egress openings: 15.2×91.4 cm
diameter of rods 35 and 37: 1.3 cm
diameter of rod 36: 1.9 cm
chain spacers: 1.9×2.5 PVC pipe spacers
chains: 1.3×15.2 cm For a unit having the above typical dimensions, exemplary rod rotation speeds ranging from about 165 to 660 rpm are suitable.

I claim:

1. A method of despining spiny cactus pads comprising
    a. centrifugally impelling said pads in a spiralling-outward pathway, wherein said pathway's outermost perimeter is partially lined with spine shearers so that any pads travelling along said outermost perimeter come in contact with said spine shearers thereby forming spine pieces and at least partially despined pads; and
    b. separating said spine pieces from said at least partially despined pads.

2. The method of claim 1 wherein pads are centrifugally propelled through a series of spiral pathways so that said pads become progressively more despined in each pathway, and are substantially completely despined by the last pathway in said series.

* * * * *